US011412735B2

(12) United States Patent
Arachchige et al.

(10) Patent No.: US 11,412,735 B2
(45) Date of Patent: Aug. 16, 2022

(54) PRE-EMERGENT HERBICIDE

(71) Applicant: W. Neudorff GMBH KG, Emmerthal (DE)

(72) Inventors: Chandanie W. Arachchige, Vancouver (CA); Deepal Samarajeewa, Vancouver (CA)

(73) Assignee: W. Neudorff GMBH KG, Emmerthal (DE)

( * ) Notice: Subject to any disclaimer, the term of this patent is extended or adjusted under 35 U.S.C. 154(b) by 204 days.

(21) Appl. No.: 16/328,707

(22) PCT Filed: Aug. 30, 2017

(86) PCT No.: PCT/EP2017/071807
§ 371 (c)(1),
(2) Date: Feb. 26, 2019

(87) PCT Pub. No.: WO2018/041916
PCT Pub. Date: Mar. 8, 2018

(65) Prior Publication Data
US 2019/0191699 A1     Jun. 27, 2019

(30) Foreign Application Priority Data

Aug. 30, 2016 (GB) ..................................... 1614648

(51) Int. Cl.
| | |
|---|---|
| *A01N 37/44* | (2006.01) |
| *A01N 65/44* | (2009.01) |
| *A01N 65/00* | (2009.01) |
| *A01N 39/04* | (2006.01) |
| *A01N 37/32* | (2006.01) |

(52) U.S. Cl.
CPC ............. *A01N 37/44* (2013.01); *A01N 37/32* (2013.01); *A01N 39/04* (2013.01); *A01N 65/00* (2013.01); *A01N 65/44* (2013.01)

(58) Field of Classification Search
CPC ........ A01N 37/44; A01N 65/00; A01N 39/04; A01N 37/32; A01N 65/44
See application file for complete search history.

(56) References Cited

U.S. PATENT DOCUMENTS

| | | | |
|---|---|---|---|
| 4,508,559 | A | 4/1985 | Kollman |
| 4,975,110 | A | 12/1990 | Puritch et al. |
| 5,035,741 | A | 7/1991 | Puritch et al. |
| 5,098,468 | A | 3/1992 | Puritch et al. |
| 5,106,410 | A | 4/1992 | Puritch et al. |
| 6,218,336 | B1 | 4/2001 | Coleman |
| 6,271,177 | B1 | 8/2001 | Hudetz |
| 6,372,690 | B1 | 4/2002 | Gregoire et al. |
| 6,509,297 | B1 | 1/2003 | Coleman |
| 6,812,190 | B2 | 11/2004 | Coleman |
| 6,969,696 | B2 | 11/2005 | Coleman |
| 8,987,171 | B2 * | 3/2015 | Samarajeewa ......... A01N 59/16 504/194 |
| 2003/0181332 | A1 | 9/2003 | Sedun et al. |
| 2010/0267562 | A1 | 10/2010 | Christians |
| 2011/0306495 | A1 | 12/2011 | Samarajeewa et al. |
| 2012/0149569 | A1 | 6/2012 | Prosch et al. |
| 2013/0129804 | A1 | 5/2013 | Schweinsberg et al. |
| 2013/0130897 | A1 | 5/2013 | Christians et al. |
| 2013/0287749 | A1 | 10/2013 | Wirth et al. |
| 2016/0157493 | A1 | 6/2016 | Sedun et al. |
| 2019/0124928 | A1 | 5/2019 | Arndt et al. |

FOREIGN PATENT DOCUMENTS

| | | |
|---|---|---|
| CN | 101928170 | 12/2010 |
| CN | 102422993 | 4/2012 |
| CN | 102503641 | 6/2012 |
| CN | 103319256 | 9/2013 |
| CN | 104489364 | 4/2015 |
| GB | 1287749 | 9/1972 |
| GB | 1491215 | 11/1977 |
| JP | 2009/256278 | 11/2009 |
| WO | 2003/073856 | 9/2003 |
| WO | 2009/048345 | 4/2009 |
| WO | 2011/005742 | 1/2011 |
| WO | 2011/154541 | 12/2011 |
| WO | 2015/126267 | 8/2015 |

OTHER PUBLICATIONS

Bonnardeaux, J. (2007), Uses for canola meal. Department of Agriculture and Food, Western Australia, Perth. Report. (Year: 2007).*
GB Search Report dated Aug. 30, 2016 for GB application No. 1603575.0, 4 pages.
International Search Report and Written Opinion dated Mar. 1, 2017 for PCT application No. PCT/EP2016/082507, 13 pages.
Written Opinion of the International Preliminary Examining Authority dated Feb. 19, 2018 for PCT application No. PCT/EP2016/082507, 8 pages.
Shrestha, A. et al., "Comparative efficacy of white mustard (*Sinapis alba* L.) and soybean (*Glycine max* L. Merr.) seed meals as bioherbicides in organic broccoli (*Brassica oleracea* Var. Botrytis) and spinach (*Spinacea oleracea*) production", Communications in Soil Science and Plant Analysis, vol. 46, No. 1, pp. 33-46, (2014).
Yu, J. et al., "Response of seven weed species to corn gluten meal and white mustard (*Sinapis alba*) seed metal rates", Weed Technology, vol. 28, No. 1, pp. 259-265 (2014).
Wang, X. et al., "Herbicidal activity of mustard seed meal (*Sinapis alba* 'IdaGold' and *Brassica juncea* 'Pacific Gold') on weed emergence", Industrial Crops and Products, vol. 77, pp. 1004-1013 (2015).

(Continued)

*Primary Examiner* — Dominic Lazaro
(74) *Attorney, Agent, or Firm* — Evan Law Group LLC

(57) ABSTRACT

An environmentally compatible, pre-emergent herbicidal composition is provided that comprises a fertilizer seed meal and a transition metal chelate for enhancing the efficacy of the composition. The transition metals chelate can enhance, even synergistically effect the efficacy of the composition, while maintaining the selectivity of the herbicide.

22 Claims, No Drawings

(56) References Cited

OTHER PUBLICATIONS

International Search Report and Written Opinion dated Nov. 7, 2017 for PCT application No. PCT/EP2017/071807, 16 pages.
GB Search Report dated Dec. 20, 2016 for GB application No. GB1614648, 4 pages.
4 pages, Aug. 30, 2016, GB1603575.0, GB.
4 pages, Dec. 20, 2016, GB1614648.2, GB.
16 pages, Nov. 7, 2017, PCT-EP-2017-071807, EP.
17 pages, May 16, 2018, PCT-EP-2016-082507, EP.
8 pages, Oct. 3, 2019, U.S. Appl. No. 16/081,870, US.
22 pages, Apr. 17, 2020, U.S. Appl. No. 16/081,870, US.
6 paes, Feb. 3, 2020, 16823289.0, EP.
4 pages, Jun. 29, 2020, U.S. Appl. No. 16/081,870, US.
6 pages, Jul. 21, 2020, 17768384.4, EP.
3 pages, Apr. 15, 2021, 16823289.0.
36 pages, Sep. 3, 2018, PCT-EP-2017-071807.
Bonnardeaux, J., "Uses for canola meal", Department of Agriculture and Food, Western Australia, pp. 1-11, (2007).
Sigma-Aldrich, Safety Data Sheet for "Ethylenediaminetetraacetic acid", pp. 1-7, found at sigma-aldrich.com, printed on Sep. 7, 2018.
Lake, B., "Understanding Soil pH", NSW Agriculture, pp. 1-4, printed on Sep. 7, 2018.

\* cited by examiner

PRE-EMERGENT HERBICIDE

FIELD OF THE INVENTION

The present invention is directed to fertilizer seed meal (FSM) having enhanced pre-emergent herbicidal properties, and to the use thereof as a pre-emergent herbicide.

BACKGROUND

The selective control of unwanted vegetation, such as weeds, is a major industry. Vegetation can be controlled using herbicides that are pre-emergent or post-emergent. Pre-emergent herbicides, by definition, are herbicides that are applied prior to weed seed emergence above the ground. Post-emergent herbicides are used to kill weeds after they have emerged above the ground.

At present, there are several common types of pre-emergent herbicides on the market. Examples include dinitroaniline herbicides such as oryzalin (3,5-dinitro-N4,N4-dipropylsulfanilamide), and prodiamine herbicides (2,4-dinitro-3-N,3-N-dipropyl-6-(trifluromethyl)benzene-1,3-diamine). Oryzalin prevents germination by disrupting mitosis, which inter alia inhibits the formation of microtubules. Prodiamine prevents germination by inhibiting the activity of one or more essential pre-emergent enzymes.

In contrast, post-emergent herbicides are initially taken up by the leaves, stem or roots of a plant, and subsequently moved throughout the plant. As such, post-emergent herbicides typically have a systemic mode of action. At present, there are several common types of post-emergent herbicides on the market. Examples include phenoxy acid herbicides such as 2,4-D (2,4-Dicholorophenoxyacetic acid), 2,4-DP (2,4-Dicholorophenoxypropionic acid, or Dichlorprop), and mecoprop (2-(2-methyl-4-chlorophenoxy) propionic acid). 2,4-D and 2,4-DP are transported to cells throughout a plant where they act by affecting nucleic acid and protein synthesis, enzyme activity, respiration, and cell division. Mecoprop, following similar systemic delivery, acts by affecting enzyme activity and plant growth. Further examples include benzoic acid herbicides such as dicamba, which exert similar systemic effects.

The use of synthetic pesticides for weed control has raised concerns about human and environmental safety. There is therefore a need for safer pesticides.

Fertilizer seed meals (FSMs) have been used (though with limited success) as pre-emergent herbicides. This group of seed meal is represented by corn gluten meal (CGM), canola meal (CM), and mustard seed meal (MSM). Indeed, canola is a member of the mustard plant family. As their name indicates, this group of plant seed meal is commonly employed as plant fertilizer. The meal employed is typically in the form of a by-product from the crop seed related industries, such as the waste provided following milling, oil extraction or bio-fuel preparation. Alternatively, raw (unprocessed) seed meal may be employed.

CGM may be provided as a by-product of corn (maize) from the wet-milling process, and has been shown to inhibit germination of a wide range of weed species without adversely affecting mature plants. One such currently available commercial CGM product is "Natural Origins 9-0-0 Corn Gluten Meal Weed and Feed" (supplied by ECO Lawn & Garden). CGM may also be provided in a hydrolysed liquid form (e.g. following enzymatic hydrolysis). One such currently available commercial product is "Green-it" (supplied by Environmental Factor).

CGM is distinct (both structurally and functionally) from corn meal. CGM is a byproduct of corn processing, and thus the term CGM (which is not edible by human standards) excludes corn meal.

Mustard seed meal (MSM), which includes canola meal (CM), may be provided as a by-product resulting from crushed seed (e.g. as a by-product of the biofuel industry), and has been shown to inhibit germination of a wide variety of weeds without adversely affecting mature plants. MSM may also be provided in a hydrolysed form.

Whilst the use of FSMs such as CM, CGM and MSM as a pre-emergent herbicide is discussed in the art, their overall efficacy and the cost effectiveness remain major concerns, especially when compared to their synthetic herbicide counterparts. For example, FSMs contain a notable concentration of nitrogen, which provides an undesirable fertilizer effect for any weeds that are not adequately addressed by the pre-emergent herbicide. In addition, FSMs typically require application in large quantities to a target site. For example, MSM application rates are 10- to 20-fold higher than typical granular herbicides. As a consequence, transportation of FSMs from industrial facilities to end users in adequate quantities represents a major factor influencing the overall cost.

To-date, attempts to improve the pre-emergent herbicidal efficacy of FSMs have had limited effect. Accordingly, there remains a need for FSM products having improved pre-emergent herbicidal efficacy.

SUMMARY OF THE INVENTION

The present inventors have surprisingly discovered that coordinated use of a transition metal chelate significantly enhances the pre-emergent herbicidal effect of a fertilizer seed meal FSM. This is surprising as hitherto transition metal chelates have been employed as post-emergent herbicides (which are considered a mechanistically distinct class of herbicide). Thus, not only have the present inventors identified a new technical field of application (i.e. pre-emergent herbicides) for a transition metal chelate, they have also identified an unexpected technical effect within said field (i.e. enhanced efficacy of FSM).

According to one aspect there is provided a pre-emergent herbicidal composition comprising:
a. a fertilizer seed meal (FSM); and
b. a transition metal chelate;
   wherein said composition has enhanced pre-emergent herbicidal activity when compared with an otherwise identical composition lacking said transition metal chelate.

Naturally, said comparative assessment is performed under the same (else substantially the same) conditions.

An FSM of the invention is environmentally compatible, and provides a safer alternative to toxic chemicals and/or hazardous substances (e.g. chloroxuron). An FSM of the invention is distinct (both structurally and functionally) from components such as osseous meal, cereal meal (e.g. wheat meal or rye meal) and grain (e.g. wheat grain).

In another aspect there is provided use of a transition metal chelate for enhancing the pre-emergent herbicidal activity of a fertilizer seed meal (FSM).

In another aspect the invention provides a method for protecting a target area from the growth of pre-emergent undesired vegetation, said method comprising providing:

a. a fertilizer seed meal (FSM); and
b. a transition metal chelate; and
c. contacting said target area with said fertilizer seed meal and said transition metal chelate,
 wherein, following said contacting step, the emergence of undesired vegetation within said target area is suppressed.

In another aspect the invention provides a method for selectively protecting a target area from the growth of pre-emergent undesired vegetation whereas the growth of desired vegetation is relatively unharmed, said method comprising providing:
a. a fertilizer seed meal (FSM); and a transition metal chelate and
b. contacting said target area with said fertilizer seed meal (FSM) and said transition metal chelate,
 wherein, following said contacting step, the emergence of undesired vegetation within said target area is preferentially suppressed whereas the growth desired vegetation within said target area is relatively unharmed.

In another aspect, there is provided a method for manufacturing a pre-emergent herbicidal composition comprising admixing a fertilizer seed meal (FSM) and a transition metal chelate. The transition metal chelate may be added as single component and/or may be formed in situ, for example by addition of separate transition metal salt and chelate components.

A further aspect of the invention provides a kit for protecting a target area from the growth of pre-emergent undesired vegetation comprising:
 a. a fertilizer seed meal (FSM); and
 b. a transition metal chelate; and
 c. instructions for the formulation, storage and/or application of said kit components for protecting a target area from the growth of pre-emergent undesired vegetation.

DETAILED DESCRIPTION

The present inventors have surprisingly discovered that use of a transition metal chelate enhances (e.g. synergistically enhances) the pre-emergent herbicidal activity of fertilizer seed meal (FSM).

Thus, in use of the invention, the transition metal chelate enhances the pre-emergent herbicidal activity of FSM.

Fertilizer seed meal (FSM) is commercially available for use as a pre-emergent herbicide (e.g. "Natural Origins 9-0-0 Corn Gluten Meal Weed and Feed" supplied by ECO Lawn & Garden). This group of seed meal is represented by corn gluten meal (CGM), canola meal (CM), and mustard seed meal (MSM). Canola is a member of the mustard plant family, and as such seed meal from the plant Family Brassicaceae may be employed. Examples include *B. napus, B. nigra* and *B. juncea*. Another example is *Sinapis alpa*. This group of plant seed meal is commonly employed as plant fertilizer. The meal employed is typically in the form of a by-product from the crop seed related industries, such as the waste provided following milling, oil extraction or bio-fuel preparation. Alternatively, seed meal may be employed as hydrolysed seed meal (e.g. "Green-it" as supplied by Environmental Factor), or as raw (unprocessed) seed meal.

An FSM of the invention typically comprises a glucosinolate (e.g. glucolimnanthin).

The FSM component and the transition metal chelate component are applied to a selected target area. Said target area is typically an area of soil, which contains pre-emergent undesired vegetation or is suspected to contain pre-emergent undesired vegetation. The latter includes a scenario in which pre-emergent undesired vegetation may become present in the target area, for example shortly after application of the FSM & transition metal chelate components of the invention to the target area. When undesired vegetation is present in the target area, application of the FSM & transition metal chelate components of the invention may contact any part of the pre-emergent structure.

Reference to pre-emergent vegetation means that the vegetation in question is not visible above the substrate (e.g. soil) level. Pre-emergent vegetation therefore embraces ungerminated seed and germinated seed that has not yet broken through the substrate layer.

The target area may include desired vegetation. Said desired vegetation may be present in the form of pre- and/or post-emergent desired vegetation (preferably in the form of post-emergent desired vegetation). When desired vegetation is present in the target area, application of the FSM & transition metal chelate components of the invention may contact any part of the pre-emergent structure (e.g. seed, tubule, or root) and/or post-emergent structure (e.g. leaf, stem, or root) of the desired vegetation.

In use, the FSM & transition metal chelate components of the invention are applied to the target area in a "herbicidally effective amount". Thus, when applied to the target area in said amount, the combination is able to contact with and suppress germination/emergence of the undesired vegetation located within the target area.

Reference to "suppress" is considered synonymous with terminally inhibiting or eliminating germination/emergence of the undesired vegetation to which it is applied.

When desired vegetation is also present in the target area, growth of undesired pre-emergent vegetation is preferentially suppressed while growth of the desired vegetation is relatively unharmed. In this regard, should accidental damage of desired vegetation occur, this is typically of a transient nature and the desired vegetation is able to recover. Occasionally, a very low incidence of accidental suppression of desired vegetation may be observed. Whilst to be ideally avoided, a skilled person would appreciate that such observations are considered synonymous with the terms 'unharmed' and 'relatively unharmed' as used herein.

In the context of the present invention, desired vegetation refers to grass, lawn, food crops and/or pastureland, and preferably refers to a grass (e.g. a lawn grass).

In the context of the present invention, undesired pre-emergent vegetation may comprise or consist of dandelions (e.g. *Taraxacum officinale*), false dandelions (e.g. *Hypochoeris radicata*), white clover (e.g. *Trifolium repens*), daisies (e.g. English daisy *Bellis perennis*), chickweed (e.g. *Stellaria media*), and black medick (e.g. *Medicago lupulina*), mosses, liverworts, ferns, horsetails, conifers, dicotyledonous plants, monocotyledonous plants, algae or combinations thereof.

The composition can be used in both residential and commercial plant or crop areas, and it is very effective against common weeds such as dandelions.

Undesired vegetation attracts and/or harbors pests (e.g. insect pests), which are therefore drawn to and feed on the desired vegetation. Thus, by inhibiting emergence of undesired vegetation, the present invention provides a means for controlling pest (e.g. insect pest) damage of desired vegetation (e.g. grass, lawn, pastureland and/or food crops).

Transition metal chelates of, or for use in, the present invention may include any transition metal chelates disclosed in WO 03/073856 and/or WO 2011/154541 (the teaching of which is incorporated herein by reference). Alternatively or additionally, the transition metal chelates may be formed using any of the methods disclosed in WO 03/073856 and/or WO 2011/154541.

The transition metal chelate can be formed using various techniques known in the art. For example, the transition metal ions can be in the form of a transition metal salt, such as transition metal chlorides, transition metal sulfates, transition metal nitrates, transition metal citrates, transition metal phosphates, transition metal chelates, transition metal sulfides, transition metal sulfites, transition metal succinates, transition metal gluconates, transition metal lactates, transition metal formates, transition metal nitrites, transition metal salicylates, transition metal carboxylic acids, or in combinations of these salts. A preferred transition metal sulfate is ferrous sulfate ($FeSO_4$). The chelating agent can also have various forms. In one embodiment, a chelating agent may be a free acid. In another embodiment the chelating agent may be a salt. Commercially available metal chelates can also be used.

The present invention may include a potassium-containing salt, a sodium-containing salt or a combination thereof (preferably a potassium-containing salt).

Any suitable transition metal may be comprised in the transition metal chelate. In one embodiment the transition metal may comprise (or consist of) iron, copper, manganese, nickel, zinc or combinations thereof. Suitably, the transition metal for use in a transition metal chelate according to the invention may comprise (or consist of) iron.

Preferred chelating agents include EDTA, HEDTA, EDG, EDDS, GLDA MGDA, isomers thereof, or combinations thereof, in particular EDTA and/or HEDTA.

In one embodiment, a transition metal chelate may be in the form of a nano-transition metal chelate. A nano-transition metal chelate may comprise a particle with a diameter of less than 100, 75, 50 or 25 nanometres. Preferably, a nano-transition metal chelate is a nano-iron chelate, and typically comprises less than 50%, 30%, 20% or 10% iron by weight. Preferably, a nano-iron chelate comprises about 9% or about 7% iron by weight—examples include commercially available products such as Khazra Nano Chelated Iron Fertilizer 7% and Khazra Nano Chelated Iron Fertilizer 9%.

In embodiments where an iron chelate is employed, the chelating agent may be selected from hydroxyethylenediaminetriacetic acid, ethylenediaminetetraacetic acid, diamino cyclohexane tetraacetic acid, ethylenediamine disuccinic acid, ethanoldiglycine, methylglycinediacetic acid, gluconic acid, glutamicaciddiacetic acid, aminotri(methylenephosphonic acid), ethanoldiglycine, hydroxyethyldiphosphonic acid, iminodisuccinic acid, hydroxy iminodisuccinic acid or combinations thereof and/or salts thereof, in particular FeEDTA and/or FeHEDTA. One of applicant's commercial products, FIESTA™ (which contains iron as an active ingredient, present as FeHEDTA) is preferred.

A composition of the present invention may be supplemented with a glucosinolate (e.g. glucolimnanthin).

Enhanced Pre-Emergent Herbicidal Activity

An assessment of said "herbicidal activity" can be made using a "weed emergence assay" taught herein.

The "weed emergence suppression assay" comprises:
applying an amount of a composition or the components thereof to a target area comprising pre-emergent undesired vegetation; and following application (e.g. after at least 7, 14 or 21 days from application) assessing emergence visually using a percentage rating scale from 100% (no undesired vegetation emergence) to 0% (complete undesired vegetation emergence=untreated control).

As hereinbefore discussed, the presence of a transition metal chelate enhances the pre-emergent herbicidal activity of FSM. Said enhanced herbicidal activity may be readily confirmed via a simple comparative experiment employing the "weed emergence suppression assay" described above (and as illustrated in the Examples). In more detail, two compositions containing the same FSM (one composition including a transition metal chelate, and the other composition not including said transition metal chelate) are tested in parallel (under identical or otherwise experimentally equivalent conditions) by application to a target area comprising pre-emergent undesired vegetation, and their respective weed emergence suppression scores are compared. To ensure optimal comparative testing, the amount of FSM applied per target area (i.e. grams per $m^2$) should be the same for the two compositions being tested in parallel. By way of example, in one embodiment, the two compositions being tested employ the same concentration of FSM, and each composition is applied to an identical/equivalent target area ($m^2$). Said target area may include desired vegetation. When assaying a composition of the present invention, should the FSM & transition metal chelate components thereof be applied sequentially, said time between said applications should ideally be as short as possible.

In one embodiment, the presence of a transition metal chelate enhances the pre-emergent herbicidal activity of a composition of the present invention (or the components thereof) by at least 5% (e.g. corresponding to at least a 5% score increase in a "weed emergence suppression assay" as described herein) when compared to an otherwise identical 'control' composition that does not comprise said transition metal chelate component.

The present invention embraces adding a transition metal chelate to a FSM composition that otherwise has only a low/poor pre-emergent undesired vegetation herbicidal activity, such that following said addition the composition is now capable of demonstrating an improved herbicidal activity. This improvement is consistent with providing an enhanced herbicidal activity.

In one embodiment, the presence of a transition metal enhances the pre-emergent undesired vegetation herbicidal activity of a composition of the present invention (or the components thereof) by at least 10% or by at least 15% (e.g. corresponding to at least a 10% or at least a 15% score increase in a "weed emergence suppression assay" as described herein) when compared to the corresponding 'control' composition (absent said transition metal component as hereinbefore described).

In another embodiment, the presence of a transition metal enhances the pre-emergent undesired vegetation herbicidal activity of a composition of the present invention (or the components thereof) by at least 20% or at least 30% (e.g. corresponding to at least a 20% or at least a 30% score increase in a "weed emergence suppression assay" as described herein) when compared to the corresponding 'control' composition (absent said transition metal component as hereinbefore described).

Suitably, the presence of a transition metal enhances the pre-emergent undesired vegetation herbicidal activity of a composition of the present invention (or the components thereof) by at least 40% or at least 50% (e.g. corresponding to at least a 40% or at least a 50% score increase in a "vegetation damage assay" as described herein) when compared to the corresponding 'control' composition (absent said transition metal component as hereinbefore described).

In one embodiment, a ready-to-use (RTU) solid composition of the present invention typically comprises 20% to 95% (weight by weight) FSM, for example 40% to 95% (w/w) FSM or 60% to 90% FSM (w/w).

A solid RTU formulation of the invention may be applied to pre-emergent undesired vegetation or soil and optionally to desired vegetation at a rate in the range about 50 g/m$^2$ to 300 g/m$^2$, for example 65 g/m$^2$ to 150 g/m$^2$.

In preferred embodiment, the solid RTU formulation may be applied to pre-emergent undesired vegetation or soil and optionally to desired vegetation at a rate in the range about 70 g/m$^2$ to 100 g/m$^2$.

A composition (e.g. solid RTU formulation) of the present invention typically comprises a transition metal chelate (e.g. an iron chelate) at a concentration of at least about 1.5% by weight to about 12.0% (e.g. 4.8%) by weight in the ready to use (RTU) product.

In one embodiment of the present invention a composition of the invention may comprise a transition metal (suitably iron) present as metal chelate at a concentration of at least about 0.2% by weight iron to about 5% by weight in the ready to use (RTU) product.

In one embodiment, a composition of the invention may comprise a transition metal (suitably iron) present as metal chelate at a concentration between about 2.0% to about 5.0% by weight iron, suitably at a concentration between about 2% to about 3% by weight iron in the ready to use (RTU) product.

In one embodiment, a ready-to-use (RTU) solid composition of the present invention may comprise an FSM at a concentration of at least about 20% to 95% (weight by weight), for example 40% to 95% (w/w) FSM or 60% to 90% FSM (w/w), and a transition metal chelate (e.g. an iron chelate) at a concentration of at least about 1.5% (w/w) to about 12.0% (w/w).

In one embodiment, a RTU solid composition of the present invention may comprise an FSM at a concentration of at least about 20% to 95% (weight by weight), for example 40% to 95% (w/w) FSM or 60% to 90% FSM (w/w), and a transition metal chelate (e.g. an iron chelate) at a concentration of at least about 0.2% (w/w) to about 5% (w/w).

In one embodiment, a RTU solid composition of the present invention may comprise an FSM at a concentration of at least about 20% to 95% (weight by weight), for example 40% to 95% (w/w) FSM or 60% to 90% FSM (w/w), and a transition metal chelate (e.g. an iron chelate) at a concentration of at least about 2.0% (w/w) to about 5.0% (w/w).

As discussed above, the addition of transition metal chelate enhances the pre-emergent undesired vegetation herbicidal activity efficacy of FSM. For example, a transition metal chelate may enhance FSM inhibition of root formation of germinating plants.

The transition metal chelate may be added to the pre-emergent herbicidal composition at the time of formulation, or it can be provided as a separate composition that is admixed with one or more further ingredient(s) prior to or during application to pre-emergent vegetation (including target area/soil). Alternatively or additionally, said transition metal chelate may be applied separately to pre-emergent vegetation (including target area/soil).

The composition of the invention may be applied to a target area in the form of a dry powder. Alternatively, the composition of the invention may be applied to a target area in the form of a liquid formulation (e.g. a spray, such as an aqueous spray).

When separately (i.e. sequentially) applying the FSM and transition metal chelate components of the invention to a target area, said components are each typically applied in the same form (i.e. both components are either applied as a dry powder or as a liquid formulation). Alternatively, one component may be applied in dry powder form and the other component may be applied in a liquid form.

When employing a liquid RTU formulation, a composition of the invention may typically employ 3% to 50% liquid FSM (e.g. weight by weight), for example 5% to 30% FSM (w/w) or 5% to 10% FSM (w/w).

In one embodiment, a liquid RTU composition of the present invention may comprise a liquid FSM at a concentration of at least about 3% to 50% (e.g. weight by weight), for example 5% to 30% FSM (w/w) or 5% to 10% FSM (w/w), and a transition metal chelate (e.g. an iron chelate) at a concentration of at least about 1.5% (w/w) to about 12.0% (w/w).

In one embodiment, a liquid RTU composition of the present invention may comprise a liquid FSM at a concentration of at least about 3% to 50% (e.g. weight by weight), for example 5% to 30% FSM (w/w) or 5% to 10% FSM (w/w), and a transition metal chelate (e.g. an iron chelate) at a concentration of at least about 0.2% (w/w) to about 5% (w/w).

In one embodiment, a liquid RTU composition of the present invention may comprise a liquid FSM at a concentration of at least about 3% to 50% (e.g. weight by weight), for example 5% to 30% FSM (w/w) or 5% to 10% FSM (w/w), and a transition metal chelate (e.g. an iron chelate) at a concentration of at least about 2.0% (w/w) to about 5.0% (w/w).

In one embodiment, a liquid RTU composition of the present invention may comprise a liquid FSM at a concentration of at least about 3% to 50% (e.g. weight by weight), for example 5% to 30% FSM (w/w) or 5% to 10% FSM (w/w), and a transition metal chelate (e.g. an iron chelate) at a concentration of at least about 2% to about 3% (w/w).

In one embodiment, a liquid RTU composition of the present invention may comprise a liquid FSM at a concentration of at least about 3% to 50% (e.g. weight by weight), for example 5% to 30% FSM (w/w) or 5% to 10% FSM (w/w), and a transition metal chelate (e.g. an iron chelate) at a concentration of at least about 0.2% to about 0.4% (w/w).

When referring to the amount, e.g., concentration and molar ratio, of the metal component in the composition, the amount is based on the amount of metal ions present within the metal component.

Alternatively or in addition to the above ingredients, in one embodiment a composition of the invention may be formulated with one or more further components. For example, the composition may be formulated with one or more component selected from growth regulators, fertilizers, herbicides, thickening agents, sugar, baking soda, humectants, antioxidants, stabilizing agents, wetting agents, sequestrants, solvents, dyes, or combinations thereof, UV absorbers and drying agents.

Alternatively, the composition may be formulated with one or more component selected from growth regulators, fertilizers, herbicides, thickening agents, sugar, baking soda, diatomaceous earth, molasses powder, humectants, antioxidants, stabilizing agents, wetting agents, sequestrants, solvents, dyes, or combinations thereof, UV absorbers and drying agents. Preferably, the composition may be formulated with molasses powder.

Suitable humectants may include propylene glycol, glycerin, beet molasses, or combinations thereof. Suitable antioxidants may include citric acid. Suitable stabilizing agents may include citric acid, ammonium compounds, or combinations thereof. Suitable wetting agents may include carboxylic acids (or salts thereof) or silicone polymers (e.g. Silwet 77 (Witco Corp, Conn., USA)). Suitable preservatives may include Kathon® (a mixture of 5-chloro-2-methyl-4-isothiazolin-3-one and 2-methyl-4-isothiazolin-3-one, made by Rohm & Haas of Hayward, Calif.), sorbic acid, sodium benzoate, sodium propionate, parabens, isopropyl alcohol, ethanol or combinations thereof. The end-use concentration of such additives may vary, but in some embodiments, the concentration may be between about 0.1 to about 5% by weight.

A variety of fertilizers can be added to the pre-emergent herbicidal composition of the present invention. Preferably, the fertilizer is a nitrogen-containing fertilizer that is effective to promote the rapid growth of grass, thereby allowing the grass to shade and out-compete the damaged weeds.

Suitably the composition of the invention may be formulated with a fertilizer, such as a fertilizer selected from urea ammonium salts like ammonium chloride, ammonium nitrate, ammonium sulfate, ammonium sulfate, leather meal, bone meal, plant meals, ammonium potassium phosphate, potassium salts like potassium chloride, sodium salts including sodium chloride or combinations thereof.

Any end use concentration of a fertilizer is contemplated in the present invention. In one embodiment a fertilizer may be added to a composition of the present invention with an end use concentration in the range of about 20% to about 70% by weight, suitably in the range of about 40 to about 70% by weight.

In some embodiments one or more growth regulators may be added to a composition of the present invention. By way of non-limiting example, the growth regulators added to the herbicidal compositions may include maleic hydrazide (MH), cycocel (2-chloroethyl-trimethyl ammonium chloride), auxin derivatives, and combinations thereof. The end-use concentration of the additional growth regulators can vary. In one embodiment the concentration may be between about 100 ppm (e.g. 0.01%) to about 2% by weight.

The herbicidal compositions of the present invention may also include natural growth regulators, such as for example, salicylic acid, salts of salicylic acid including ammonium salicylate, jasmonates, ethylene, auxins, gibberellins, cytokinins, abscisic acid, or combinations thereof. The end-use concentration of these natural growth regulators can vary, but in some embodiments may be between about 10 ppm (e.g. 0.001%) to about 5% by weight.

In addition to the transition metal chelates disclosed herein, a composition of the invention may comprise one or more further herbicidally effective ingredients (e.g. a co-active ingredient). In one embodiment the one or more further herbicidally effective ingredients may be selected from glyphosate, glufosinate, ammonium pelargonate, pelargonic acid, medium chain fatty acids and their salts, urea, sodium, borax, copper sulfate, carboxylic acids or the salts thereof, ammonium compounds, calcium compounds, or combinations thereof. The end-use concentration of the additional herbicide(s) can vary, but in some embodiments, the concentration may be in between about 0.5% to about 5% by weight, suitably between about 2% to about 5% by weight.

Furthermore, a variety of bulking or thickening agents may be added to the herbicidal compositions disclosed herein. Suitable agents may include Rhodopol 23 (Rhone Poulenc), VanGel B (R. T. Vanderbilt), Kelzan S (Merck & Co.), sugars including dextrose, clays, potassium slats like potassium chloride, sodium salts, guar gum, propylene glycol, glycerol, and combinations thereof. The end-use concentration of added agents can vary, but in some embodiments may be in the range of between about 0.01 to about 10% by weight.

In one embodiment a ready-to-use (RTU) formulation (e.g. solid RTU formulation) according to the present invention may comprise (or consist of):

4.8% dry FeHEDTA
93.1% FSM, preferably corn gluten meal
2.1% Micro Cel E (drying agent)

In one embodiment a ready-to-use (RTU) formulation (e.g. solid RTU formulation) according to the present invention may comprise (or consist of):

4.8% dry FeHEDTA
94.2% FSM, preferably corn gluten meal
1% Micro Cel E (drying agent)

The RTU formulation may be prepared by admixing dry FeHEDTA powder with FSM (e.g. CGM) and the drying agent until the formulation is homogeneous. Further additives, if used, such as fertilizers may be admixed.

In one embodiment, a RTU formulation of the invention may be applied to pre-emergent undesired vegetation and optionally to desired vegetation (e.g. spread, using a drop spreader) at various rates.

A liquid formulation (RTU) of the present invention may be applied to pre-emergent undesired vegetation or soil and optionally to desired vegetation at a rate in the range about 5 g/m$^2$ to 100 g/m$^2$.

In another embodiment, the liquid formulation may be applied to pre-emergent undesired vegetation or soil and optionally to desired vegetation at a rate in the range about 5 g/m$^2$ to 50 g/m$^2$.

In preferred embodiment, the liquid formulation may be applied to pre-emergent undesired vegetation or soil and optionally to desired vegetation at a rate in the range about 10 g/m$^2$ to 30 g/m$^2$.

In one embodiment, a formulation (e.g. liquid formulation) of the invention may be applied to pre-emergent undesired vegetation and optionally to desired vegetation at a rate in the range of about 0.2 g Fe/m$^2$ to 2.0 g Fe/m$^2$. Suitably, the formulation may be applied in the range of about 0.25 g Fe/m$^2$ to 1.8 g Fe/m$^2$, more preferably at a rate of about 0.5 g Fe/m$^2$. Reference to Fe is exemplary, and the same ranges apply to other transition metal equivalents.

When applied to pre-emergent undesired vegetation alone (or where loss of residual desired vegetation is not important) higher application rates may be employed, such as greater than 2.0 g Fe/m$^2$. For example, application rates in the region of 3-5 g Fe/m$^2$ or greater may be employed. Reference to Fe is exemplary, and the same ranges apply to other transition metal equivalents.

Further additives, if used, such as fertilizers may be admixed to give 0.2 to 2.0% Fe by weight of the final RTU composition. In some embodiments, where a RTU dry formulation is used, said formulation may be applied to both desired vegetation and pre-emergent undesired vegetation using a spreader or any other application equipment at various rates. In one embodiment, the formulation may be applied at a rate in the range of 0.25 to 1.8 g Fe/m$^2$, suitably at a rate of about 0.5 g Fe/m$^2$ (e.g. 0.48 g Fe/m$^2$). Reference to Fe is exemplary, and the same ranges apply to other transition metal equivalents.

The term "selectively herbicidal" (i.e. "selectively treating/controlling pre-emergent undesired vegetation") as used herein means that a composition of the present invention is capable of destroying pre-emergent undesired vegetation to which it is applied, whilst leaving desired vegetation unharmed or relatively unharmed. The term "selective herbicide" is opposite to "non-selective herbicide" which destroys all or substantially all vegetation to which it is applied, irrespective of whether said vegetation is desired or undesired vegetation.

An assessment of "selective herbicidal activity" can be made using a "selective herbicide assay" as taught herein.

The "selective herbicide assay" comprises:
applying an amount of a composition (or the components thereof) to a target area comprising pre-emergent undesired vegetation and desired vegetation; and
following application (e.g. after at least 7, 14 or 21 days from application) assessing separately undesired vegetation emergence and desired vegetation survival visually using a percentage rating scale from 0% (no undesired vegetation emergence/no desired vegetation survival) to 100% (complete undesired vegetation emergence/complete desired vegetation survival).

A "selective herbicide activity" is typically acknowledged when an amount of a composition (or the FSM & transition metal components thereof) scores a rating of at least about 40% (suitably at least about 50%, 60% or 70%) when applied to pre-emergent undesired vegetation, and scores a rating of less than about 15% when applied to desired vegetation.

In one embodiment a selective herbicidal activity corresponds to a rating of at least about 40% when applied to pre-emergent undesired vegetation, and scores a rating of less than about 10% or 5% (suitably less than about 1%) when applied to desired vegetation.

In one embodiment a selective herbicidal activity corresponds to a rating of at least about 60% when applied to undesired vegetation, and scores a rating of less than about 10% or 5% (suitably less than about 1%) when applied to desired vegetation.

In one embodiment a selective herbicidal activity corresponds to a rating of at least about 80% when applied to pre-emergent undesired vegetation, and scores a rating of less than about 10% or 5% (suitably less than about 1%) when applied to desired vegetation.

In one embodiment a selective herbicidal activity corresponds to a rating of at least about 90% when applied to undesired vegetation, and scores a rating of less than about 10% or 5% (suitably less than about 1%) when applied to desired vegetation.

In one embodiment a selective herbicidal activity corresponds to a rating of at least about 95% when applied to pre-emergent undesired vegetation, and scores a rating of less than about 10% or 5% (suitably less than about 1%) when applied to desired vegetation.

The present invention also provides a method for controlling the growth of pre-emergent undesired vegetation and/or for selectively controlling/treating pre-emergent undesired vegetation, as hereinbefore described.

In one embodiment a herbicidal composition of the present invention may be employed in said methods.

Alternatively or additionally, separate FSM and a transition metal chelate components may be employed in said methods. For example, the methods of the invention may be carried out by contacting pre-emergent undesired vegetation (and optionally desired vegetation) with FSM component either simultaneously with, prior to or subsequent to the transition metal chelate component. In use, said FSM component and said transition metal chelate components combine/cooperate and thereby deliver an enhanced herbicidal effective amount of FSM to the pre-emergent undesired vegetation.

The term "contacting" as used in reference to a method of the invention encompasses all methods for contacting or applying a composition, or FSM and transition metal chelate to an area of vegetation known to the person skilled in the art. Contacting may include contacting vegetation directly and/or contacting the ground in which said vegetation is present.

Preferably a composition, or FSM and transition metal chelate, is applied to a target area of soil/vegetation to be protected or comprising the pre-emergent undesired vegetation (optionally comprising desired vegetation).

In one embodiment, contacting may include spraying. Accordingly, FSM component and the transition metal chelate component are applied on a target area of soil/vegetation to be protected or to pre-emergent undesired vegetation (optionally including desired vegetation). This application may encompass both applying to the desired vegetation directly (e.g. on the top growth, or portion(s) of the plant located above the soil surface) and/or applying to the ground (target area to be protected) in which said desirable vegetation is present.

Advantages

The present inventors have surprisingly found that the presence of a transition metal chelate when employed in combination with FSM demonstrates improved pre-emergent herbicidal properties (e.g. improved selectively herbicidal properties).

The inventors have demonstrated the enhancement of pre-emergent undesired vegetation herbicidal activity—see the accompanying Examples. Such enhancement may advantageously be a synergistic enhancement.

By providing a composition having enhanced pre-emergent herbicidal activity a reduced amount of said composition needs to be used when contacting a target area comprising (else likely to comprise) pre-emergent undesired vegetation and/or a target area comprising pre-emergent undesired vegetation and desired vegetation. Advantageously, the ability to use a reduced amount of said composition reduces costs, and/or results in improved efficiency of said composition. Also, a composition having enhanced pre-emergent selective herbicidal activity means that an increased concentration of said composition can be applied to an area of pre-emergent undesired and desired vegetation, advantageously resulting in increased damage and/or kill and/or suppression of growth of pre-emergent undesired vegetation whilst demonstrating minimal damage and/or kill and/or suppression of growth of desired vegetation.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

Suitable chelating agents of the present invention are described below.

A chelating agent is an organic molecule that can trap or encapsulate certain trace metal cations to prevent the cations from entering into unwanted chemical reactions and forming insoluble salts. Without wishing to be bound by theory, the chelating agent complexes the metal ions into a soluble but bound form, thus forming a metal chelate that is highly soluble in water and that can be readily taken up by vegetation.

Various chelating agents can be used to form the metal chelate. Typically, a chelating agent is a substance in which the molecules thereof form more than one bond to a single metal ion. In other words, a chelating agent is typically a multidentate ligand.

In one embodiment a chelating agent may be selected from aconitic acid, alanine diacetic acid (ADA), alkoyl ethylene diamine triacetic acids (e.g., lauroyl ethylene diamine triacetic acids (LED3A), aminotri (methylenephosphonic acid) (ATMP), asparticaciddiacetic acid (ASDA), asparticacidmonoacetic acid, diamino cyclohexane tetraacetic acid (CDTA), citraconic acid, citric acid, 1,2-diaminopropanetetraacetic acid (DPTA-OH), 1,3-diamino-2-propanoltetraacetic acid (DTPA), diethanolamine, diethanol glycine (DEG), diethylenetriaminepentaacetic acid (DTPA), diethylene triamine pentamethylene phosphonic acid (DTPMP), diglycolic acid, dipicolinic acid (DPA), ethanolaminediacetic acid, ethanoldiglycine (EDG), ethionine, ethylenediamine (EDA), ethylenediaminediglutaric acid (EDDG), ethylenediamindi(hydroxyphenylacetic acid (EDDHA), ethylenediaminedipropionic acid (EDDP), ethylenediaminedisuccinate (EDDS), ethylenediaminemonosuccinic acid (EDMS), ethylenediaminetetraacetic acid (EDTA), ethylenediaminetetrapropionic acid (EDTP), ethyleneglycolaminoethylestertetraacetic acid (EGTA), gallic acid, glucoheptonic acid, gluconic acid, glutamicaciddiacetic acid (GLDA), glutaric acid, glyceryliminodiacetic acid, glycinamidedisuccinic acid (GADS), glycoletherdiaminetetraacetic acid (GEDTA), 2-hydroxyethyldiacetic acid, hydroxyethylenediaminetriacetic acid (HEDTA), hydroxyethyldiphosphonic acid (HEDP), 2-hydroxyethyl imino diacetic acid (HIMDA), hydroxyiminodiacetic acid (HIDA), hydroxy iminodisuccinic acid (HIDS), 2-hydroxy propylene diamine disuccinic acid (HPDDS), iminodiacetic acid (IDA), iminodisuccinic acid (IDS), itaconic acid, lauroyl ethylene diamine triacetic acids (LED3A), malic acid, malonic acid, methylglycinediacetate (MGDA), methyliminodiacetic acid (MIDA), monoethanolamine, nitrilotriacetic acid (NTA), nitrilotripropionic acid (NPA), N-phosphonomethyl glycine (glyphosate), propyldiamine tetraacetic acid (PDTA), salicylic acid, serinediacetic acid (SDA), sorbic acid, succinic acid, sugars, tartaric acid, tartronic acid, triethanolamine, triethylenetetraamine, triethylene tetraamine hexaacetic acid (TTHA), (or salts thereof) or combinations thereof.

In another embodiment a chelating agent may be selected from 2-propanoltetraacetic acid, diethylenetriaminepentaacetic acid, ethanolaminediacetic acid, ethanoldiglycine, ethionine, ethylenediaminediglutaric acid, ethylenediaminedihydroxyphenylacetic acid, ethylenediaminedipropionic acid, ethylenediaminedisuccinic acid, ethylenediaminemonosuccinic acid, acid, 1,3-diamino-2-propanoltetraacetic acid, diethylenetriaminepentaacetic acid, ethanolaminediacetic acid, ethanoldiglycine, ethionine, ethylenediaminediglutaric acid, ethylenediaminedihydroxyphenylacetic acid, ethylenediaminedipropionic acid, ethylenediaminedisuccinic acid, ethylenediaminemonosuccinic acid, ethylenediaminetetraacetic acid, ethyleneglycolaminoethylestertetraacetic acid, glutamicaciddiacetic acid, glyceryliminodiacetic acid, glycinamidedisuccinic acid, glycoletherdiaminetetraacetic acid, 2-hydroxyethyldiacetic acid, hydroxyethylenediaminetriacetic acid, hydroxyiminodiacetic acid, iminodiacetic acid, iminodisuccinic acid, lauroyl ethylene diamine triacetic acid, methylglycinediacetic acid, methyliminodiacetic acid, nitrilotriacetic acid, nitrilotripropionic acid, salicylic acid, serinediacetic acid (or the salts thereof) or combinations thereof.

Other suitable chelating agents include aminopolycarboxylic acid, amines, amides, phosphonic acid, or combinations thereof. Amino acids may also be used as chelating agents. Suitable amino acids may include alanine, arginine, asparagine, aspartic acid, glutamic acid, glutamine, glycine, histidine, isoleucine, leucine, lysine, methionine, proline, serine, threonine, tyrosine, valine, or combinations thereof. Other chelating agents that may be used include beet molasses, carboxylic acids or the salts thereof, salicylic acid or the salts thereof (such as ammonium salicylate), citric acid, or combinations thereof.

In certain embodiments, chelating agents that are more readily biodegradable may be used in the compositions of the invention. Such chelating agents may include ATMP, EDG, EDDS, GLDA, HEDP, MGDA, IDS, or HIDS. Other readily biodegradable chelating agents may include citric acid, gallic acid, glutaric acid, malic acid, salicylic acid, sorbic acid, succinic acid, sugars, tartaric acid or combinations thereof. Alternatively or additionally, such biodegradable chelating agents may be selected from alanine, arginine, asparagine, aspartic acid, glutamic acid, glutamine, glycine, histidine, isoleucine, leucine, lysine, methionine, proline, serine, threonine, tyrosine, valine or combinations thereof.

In one embodiment the chelator comprised in the transition metal chelate may comprise (or consist of) an aminopolycarboxylate chelating agent. Suitably, an aminopolycarboxylate chelating agent may be selected from hydroxyethylenediaminetriacetic acid, ethylenediaminetetraacetic acid, diamino cyclohexane tetraacetic acid, ethylenediamine disuccinic acid, ethanoldiglycine, methylglycinediacetic acid, glutamicaciddiacetic acid, or combinations thereof and/or salts thereof.

In another embodiment a chelating agent may be selected from diamino cyclohexane tetra-acetic acid, ethylenediaminedisuccinic acid, ethylenediaminetetraacetic acid, ethanoldiglycine, hydroxyethylenediaminetriacetic acid, methylglycinediacetic acid, glutamic-aciddiacetic acid, diethylenetriaminepentaacetic acid, iminodisuccinic acid, their salts, or combinations thereof.

In one embodiment a composition of the invention may comprise:
a transition metal component; and
a chelating agent selected from alanine diacetic acid, alkoyl ethylene diamine triacetic acid, aminotri (methylenephosphonic acid), asparticaciddiacetic acid, asparticacidmonoacetic acid, diamino cyclohexane tetraacetic acid, citraconic acid, citric acid, 1,2-diaminopropanetetraacetic acid, 1,3-diamino-2-propanoltetraacetic acid, diethylenetriaminepentaacetic acid, ethanolaminediacetic acid, ethanoldiglycine, ethionine, ethylenediaminediglutaric acid, ethylenediaminedihydroxyphenylacetic acid, ethylenediaminedipropionic acid, ethylenediaminedisuccinic acid, ethylenediaminemonosuccinic acid, ethylenediaminetetraacetic acid, ethyleneglycolaminoethylestertetraacetic acid, glutamicaciddiacetic acid, glyceryliminodiacetic acid, glycinamidedisuccinic acid, glycoletherdiaminetetraacetic acid, 2-hydroxyethyldiacetic acid, hydroxyethylenediaminetriacetic acid, hydroxyiminodiacetic acid, iminodiacetic acid, iminodisuccinic acid, lauroyl ethylene diamine triacetic acid, methylglycinediacetic acid, methyliminodiacetic acid, nitrilotriacetic acid, nitrilotripropionic acid, salicylic acid, serinediacetic acid (or salts thereof) or combinations thereof; and a potassium-containing salt, a sodium-containing salt or a combination thereof (preferably a potassium-containing salt).

In another embodiment a composition of the invention may comprise:
a transition metal chelate formed from a transition metal (e.g. selected from iron, copper, or mixtures thereof) and a chelating agent selected from diamino cyclohexane tetra-acetic acid, ethylenediaminedisuccinic acid, ethylenediaminetetraacetic acid, ethanoldiglycine, hydroxyethylenediaminetriacetic acid, methylglycinediacetic acid, glutamic-aciddiacetic acid, diethylenetriaminepentaacetic acid, iminodisuccinic acid, their salts, and combinations thereof; and
a potassium-containing salt, a sodium-containing salt or a combination thereof (preferably a potassium-containing salt).

In a further embodiment a composition of the invention may comprise:
an active ingredient (e.g. in a herbicidal effective amount) in the form of one of, or a mixture of, iron hydroxyethylene diaminetriacetate, iron ethylenediamine tetraacetate, iron ethylene diamine disuccinate, and iron glutamic acid diacetate; and a potassium-containing salt, a sodium-containing salt or a combination thereof (preferably a potassium-containing salt).

In a yet further embodiment a composition of the invention may comprise:
an iron chelate (e.g. in a herbicidal effective amount) selected from the group consisting of iron ethylenediamine tetraacetate (Fe EDTA), iron hydroxyethylenediamine tetraacetate (Fe HEDTA), and combinations thereof.

The invention will now be described, by way of example only, with reference to the following Examples.

EXAMPLES

Materials & Methods

Dry FeHEDTA (micro-granular; Dissolvine H—Fe-13) was purchased from the company AkzoNobel. Corn gluten meal (Amaizeingly Green; N—P—K 10-0-0) and the mustard seed meal (Pescadero Gold; N—P—K 4.5-1.5-1.15) were purchased from AgGlobal (155, Gordon Baker Road, Suite 402, Toronto, ON M2H 3N7, Canada. www.buyag-global.com) and Farm Fuel Inc (275 Coward Rd, Watsonville, Calif. 95076, USA. www.farmfuelinc.com), respectively. The corn gluten meal and mustard seed meal arrived in pellet form, but were ground and sieved through a mesh (sieve opening size 850 μm) before use to obtain a particle size of ≤850 μm. FeHEDTA (4.8%) was mixed with 1% of drying agent (MICRO-CEL® E) and then mixed with fertilizer seed meal (corn gluten meal or mustard seed meal) (94.2%) and blended thoroughly until the formulation became homogeneous. The application rate was 100 g/m$^2$ for the combined treatment (94.2 g/m$^2$ for FSM and 4.8 g/m$^2$ for FeHEDTA), 4.8 g/m$^2$ for FeHEDTA treatment and 100 g/m$^2$ for FSM treatment. In the formulation, the respective FSM was simply blended with transition metal chelate and with other ingredients if applicable. Samples were usually prepared within 48 hours of treatment. All tests were done in the greenhouse.

Example 1-3 (Application on Soil)

Pots 4" in size were filled with wetted potting media and dandelion seeds were spread (0.2 g of seeds/four pots in examples 1 and 2 and 0.25 g/4 pots in example 3) evenly over each pot and lightly watered 3 hrs before treating. Seeded pots were covered with a thin layer of potting soil and treatments were applied after seeding (e.g. just after seeding). Each treatment consisted with 4 replicates. All treatments were lightly watered as needed until the seedlings emerged. Number of emerged seedlings in each pot was recorded 7 or 21 days after treatment application.

Example 4 (Application on Grass)

Pots 4" in size were filled with wetted potting media, grass (lawn) seeds (perennial rye grass) were spread until soil was completely covered with grass seeds (5 g/pot) and kept for 1 month until grass was grown. Grass was trimmed and dandelion seeds were spread (0.25 g/4 pots) evenly over each grass pot and lightly watered 24 hrs before treating. Treatments were applied after seeding (e.g. just after seeding). Each treatment consisted with 4 replicates. All treatments were lightly watered starting 24 hrs after treatments and then as needed until the seedlings emerged. Any grass damage (phytotoxicity) was visually rated at 7 and 14 days after treatment application. Number of emerged seedlings in each pot was recorded 14 days after application.

Example 1

Greenhouse Dandelion Seed Germination Test Treated with Corn Gluten Meal (CGM) and/or Transition Metal Chelate

TABLE 1

| Seedling emergence | | |
| --- | --- | --- |
| | No of seedlings (21 days after application) | Weed emergence suppression assay score |
| CGM (A) | 34 | 19.05% |
| Dry FeHEDTA (B) | 44 | −4.76% |
| A + B | 22 | 47.6% |
| Untreated | 42 | 0% |

Application of CGM and FeHEDTA combination showed superior reduction in pre-emergent test plant (undesirable vegetation) survival over the application of either CGM or FeHEDTA alone.

Example 2

Greenhouse Dandelion Seed Germination Test Treated with Corn Gluten Meal (CGM) and/or Transition Metal Chelate

TABLE 2

| Seedling emergence | | |
| --- | --- | --- |
| | No of seedlings (21 days after application) | Weed emergence suppression assay score |
| CGM (A) | 56 | 6.66% |
| Dry FeHEDTA (B) | 76 | −26.66% |
| A + B | 28 | 53.33% |
| Untreated | 60 | 0% |

Application of CGM and FeHEDTA combination showed superior reduction in pre-emergent test plant (undesirable vegetation) survival over the application of either CGM or FeHEDTA.

Example 3

Greenhouse Dandelion Seed Germination Test Treated with Corn Gluten Meal (CGM) or Mustard Seed Meal (MSM) Plus Transition Metal Chelate

TABLE 3

Seedling emergence

|  | No of seedlings 7 days after application) | Weed emergence suppression assay score |
|---|---|---|
| CGM (A) | 134 | 0% |
| MSM (B) | 83 | 38.05% |
| Dry FeHEDTA (C) | 59 | 55.07% |
| A + C | 20 | 85.07% |
| B + C | 10 | 92.53% |
| Untreated | 134 | 0% |

Application of CGM and FeHEDTA or MSM and FeHEDTA combinations showed superior reduction in pre-emergent test plant (undesirable vegetation) survival over the application of either CGM or MSM or FeHEDTA alone.

Example 4

Greenhouse Dandelion Seed Germination (in Grass) Test Treated with Corn Gluten Meal (CGM) or Mustard Seed Meal (MSM) Plus Transition Metal Chelate

TABLE 4

Weed (dandelion) Seedling emergence

|  | No of dandelion seedlings (14 days after application) | Weed emergence suppression assay score |
|---|---|---|
| CGM (A) | 65 | 14.47% |
| Dry FeHEDTA (B) | 74 | 2.63% |
| A + B | 38 | 50% |
| Untreated | 76 | 0% |

TABLE 5

Grass phytotoxicty

|  | 7 days after treatment | 14 days after treatment | Selective herbicide assay score |
|---|---|---|---|
| CGM (A) | 0 | 0 | 0% |
| Dry FeHEDTA (B) | 0 | 0 | 0% |
| A + B | 0 | 0 | 0% |
| Untreated | 0 | 0 | 0% |

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry, biochemistry and biotechnology or related fields are intended to be within the scope of the following claims.

What is claimed is:

1. A pre-emergent herbicidal composition, comprising:
   a fertilizer seed meal (FSM) as a pre-emergent herbicidal active ingredient,
   wherein the FSM is selected from the group consisting of corn gluten meal, mustard seed meal, canola seed meal, and combinations thereof; and
   a transition metal aminopolycarboxylate chelate;
   wherein said composition has enhanced pre-emergent herbicidal activity when compared with an otherwise identical composition lacking said transition metal aminopolycarboxylate chelate.

2. The composition of claim 1, wherein the FSM comprises corn gluten meal.

3. The composition of claim 1, wherein the FSM comprises mustard seed meal.

4. The composition of claim 1, wherein the FSM comprises canola meal.

5. The composition of claim 1, wherein the transition metal aminopolycarboxylate chelate comprises an aminopolycarboxylate selected from the group consisting of salts of diamino cyclohexane tetraacetic acid, ethylenediamine disuccinic acid, ethylenediaminetetraacetic acid, ethanoldiglycine, hydroxyethylenediaminetriacetic acid, methylglycinediacetic acid, glutamicaciddiacetic acid, and combinations thereof.

6. The composition of claim 1, wherein the transition metal aminopolycarboxylate chelate comprises a transition metal selected from the group consisting of copper, iron, manganese, nickel, zinc, and combinations thereof.

7. The composition of claim 6, wherein the iron is selected from the group consisting of ferric iron, ferrous iron, and combinations thereof.

8. The composition of claim 1, wherein the transition metal aminopolycarboxylate chelate is selected from the group consisting of iron hydroxyethylenediaminetriacetic acid, iron ethylenediaminetetraacetic acid, iron gluconic acid, iron glutamicaciddiacetic acid, iron ethylenediaminedisuccinate, iron methylglycinediacetate, iron aminotri (methylenephosphonic acid), iron ethanoldiglycine, iron hydroxyethyldiphosphonic acid, iron iminodisuccinic acid, and iron hydroxy iminodisuccinic acid.

9. The composition of claim 1, wherein the FSM is present within the composition at a concentration in a range of about 20% to 95% by weight.

10. The composition of claim 1, wherein the composition is a solid ready to use (RTU) composition, and wherein the FSM is present within the composition at a concentration in a range of about 70% to 95% by weight.

11. The composition of claim 10, wherein the transition metal aminopolycarboxylate chelate is present within the composition at a concentration in the range of about 1.5% to 12% by weight of the ready to use composition.

12. The composition of claim 1, wherein the composition is a liquid ready to use (RTU) composition, and wherein the FSM is present within the composition at a concentration in a range of about 3.0% to 10.0% by weight.

13. The composition of claim 1, wherein the transition metal aminopolycarboxylate chelate comprises iron, and the iron is present within the composition at a concentration in the range of about 0.2% to 5.0% by weight of the composition.

14. The composition of claim 1, wherein the composition further comprises at least one component selected from the group consisting a growth regulators, fertilizers, herbicides, sodium and potassium salts, thickening agents, humectants, sugar, baking soda, antioxidants, stabilizing agents, wetting agents, sequestrants, solvents, dyes, and combinations thereof.

15. The composition of claim 14, wherein the composition comprises fertilizer, and
the fertilizer is selected from the group consisting of urea ammonium nitrate, ammonium nitrate, urea, ammonium sulfate, and combinations thereof.

16. The composition of claim 1, wherein the transition metal aminopolycarboxylate chelate is biodegradable.

17. The composition of claim 1, wherein the composition, upon reconstitution with a liquid, does not have a pH lower than 4.0.

18. A method for protecting a target area from the growth of pre-emergent undesired vegetation, said method comprising:
providing
a. a fertilizer seed meal (FSM); and
b. a transition metal aminopolycarboxylate chelate; and
contacting said target area with said fertilizer seed meal and said transition metal aminopolycarboxylate chelate,
wherein, following said contacting step, the emergence of undesired vegetation within said target area is suppressed.

19. A method for selectively protecting a target area from the growth of pre-emergent undesired vegetation while the growth of desired vegetation is relatively unharmed, said method comprising:
providing
a. a fertilizer seed meal (FSM); and
b. a transition metal aminopolycarboxylate chelate; and
contacting said target area with said fertilizer seed meal (FSM) and said transition metal aminopolycarboxylate chelate,
wherein, following said contacting step, the emergence of undesired vegetation within said target area is preferentially suppressed while the growth of desired vegetation within said target area is relatively unharmed.

20. The method of claim 18, wherein said transition metal aminopolycarboxylate chelate is admixed with one or more further ingredient(s) prior to or during the contacting.

21. The method of claim 18, wherein said FSM is selected from the group consisting of corn gluten meal, mustard seed meal, canola meal, and combinations thereof,
and wherein the transition metal aminopolycarboxylate chelate comprises a transition metal component and a chelating agent selected from the group consisting of salts of diamino cyclohexane tetraacetic acid, ethanoldiglycine, ethylenediaminedisuccinic acid, ethylenediaminetetraacetic acid, glutamicaciddiacetic acid, hydroxyethylenediaminetriacetic acid, methylglycinediacetic acid, and combinations thereof.

22. The method of claim 21, wherein the transition metal component comprises a metal selected from the group consisting of copper, iron, manganese, nickel, zinc, and combinations thereof.

* * * * *